June 2, 1931.   L. BEHR   1,807,821

CONDUCTIVITY CELL

Filed Jan. 9, 1929

Inventor
Leo Behr
By Cornelius L. Ehret
his Attorney

Patented June 2, 1931

1,807,821

UNITED STATES PATENT OFFICE

LEO BEHR, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

CONDUCTIVITY CELL

Application filed January 9, 1929. Serial No. 331,333.

My invention relates to conductivity cells utilizable in circuits for measuring, indicating, recording or controlling the conductivity of a fluid, generally a solution of electrolyte in water or other liquid.

It is the object of my invention to render the constant or characteristics of the cell independent of its surroundings or uncontrollable factors outside of the cell, and to minimize or render negligible effects of polarization occasioned by the metal shield or other metallic masses adjacent the cell.

In accordance with my invention, to prevent flow of current in paths other than a direct fluid path between the cell electrodes, an equi-potential surface is disposed in a conductive path external to said fluid path.

Further in accordance with my invention one of the electrodes of the cell is subdivided into parts so positioned with respect to each other and to the other electrode and surrounding parts that the objects aforesaid are attained.

My invention resides in cell structure of the character hereinafter described and claimed.

For an understanding of my invention and for an illustration of one of the various forms it may take, reference is to be had to the accompanying drawings, in which.

Figure 1:
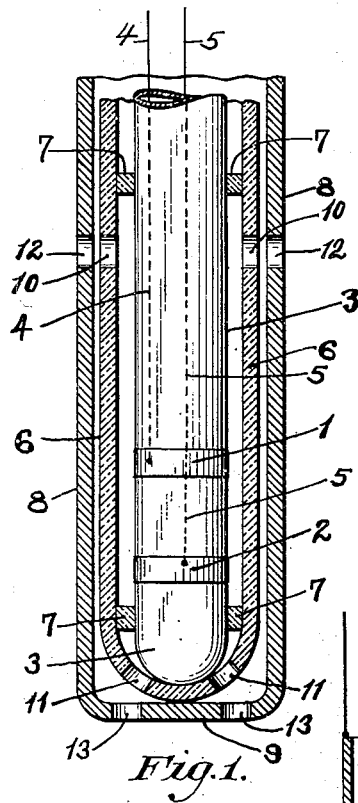
Fig. 1 is a sectional view, partly in elevation, of conductivity cell structure.

Referring to the drawings:

In Fig. 1, the cell proper comprises the electrodes 1 and 2, of any suitable material as well understood in the art, in the form of rings or bands mounted upon a suitable support 3 of insulating material. The support 3 is shown as a glass tube, closed at its lower end. Connected to the electrodes 1 and 2 are the conductors 4 and 5, respectively, sealed or extending through the wall of the tube and extending along the interior thereof to the outside of the structure where the conductors 4 and 5 are utilized for connecting the cell in any usual measuring or indicating circuit.

The member 3, carrying the electrodes, is disposed within a tube 6, generally of glass or other insulating material, and is held in spaced relation from the inner walls of the tube 6 by the circumferentially spaced members 7 as indicated. Surrounding the tube 6 is the pipe or tubular shield 8, generally of metal, and generally having an end closure 9.

In the walls of the tube 6 are apertures 10 and 11 generally adjacent to apertures 12 and 13 in the pipe or shield 8. These apertures permit free access of the electrolyte or fluid to the cell proper.

The structure described is immersed, generally to a depth above the apertures 10 and 12, in the fluid whose electrical conductivity is involved.

Figure 2:
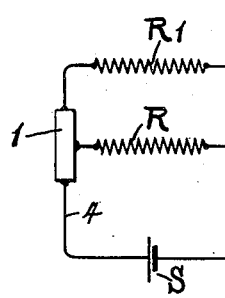
Fig. 2 is an electrical diagram explanatory thereof.

The conductivity to be measured, indicated, etc. is the reciprocal of the resistance of the fluid between the electrodes 1 and 2, the same being indicated at R Fig. 2, in which S represents any source of current, direct or alternating, whose terminals are connected respectively to the electrodes 1 and 2 by the aforesaid conductors 4 and 5.

But between the electrodes 1 and 2 there is an additional current path through resistance generically indicated at R1. This path or resistance R1, separate from the desired resistance or path R directly between the electrodes 1 and 2 in a direction substantially parallel to the axis of the tube 3, extends for example from the electrode 1 through the fluid through apertures 10, through the pipe or shield 8 if of conducting material, or if of insulating material, through the fluid within and/or outside of the shield 8, to and through apertures 11 and thence inside of the tube 6 to the electrode 2. The flow of current in this separate or additional path is undesirable for various reasons, such as, (a), that it depends on uncontrollable factors outside of the conductivity cell, and therefore makes the constant or characteristics of the cell dependent upon its surroundings; and, (b), the current in this external or separate path in entering and leaving unplatinized or not otherwise suitably treated surfaces of the shield 8, when of metal, causes polarization which may militate against the usefulness of the cell in that the polarization makes it difficult or impossible to secure a balance or other proper adjustment of the circuit in which the cell is included. Generally the cell by its conductors 4 and 5 is connected in one arm of a Wheatstone bridge, and such a system becomes erratic or undependable because of polarization effects aforesaid.

Figure 3:
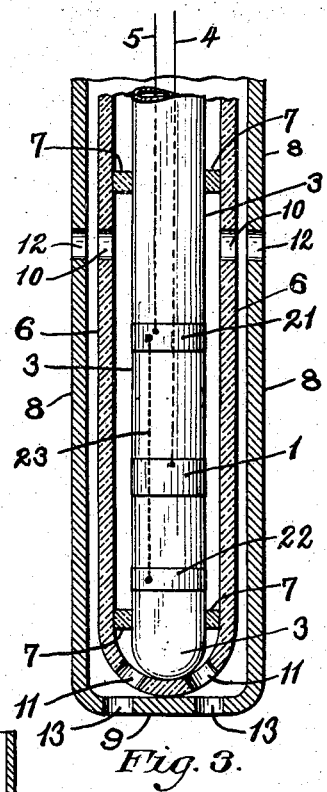
Fig. 3 is a sectional view, partly in elevation, of a conductivity cell embodying my invention.

In accordance with my invention however, the aforesaid difficulties are overcome by recourse to a structure, such as illustrated in Fig. 3, in which the resistance or current path between the cell electrodes is comprised solely by the fluid directly between the electrodes.

In Fig. 3 the structure is generally similar to that shown in Fig. 1. In this case however the second electrode is divided into a plurality of parts, as 21 and 22, electrically connected to each other by the conductor 23 of negligible resistance, disposed within the tube 3 and extending through the walls thereof into connection with the electrodes. As before the electrodes are connected respectively by conductors 4 and 5 in any suitable circuit, more particularly in one arm of a Wheatstone bridge, in one conjugate conductor of which is connected a source of current either direct or, preferably, alternating, and in another conjugate conductor of which is connected a galvanometer or equivalent.

Figure 4:
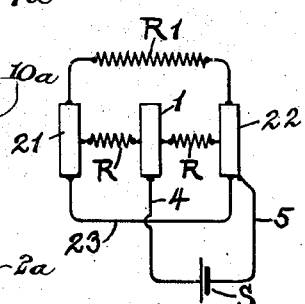
Fig. 4 is an electrical diagram explanatory of the structure such as illustrated in Fig. 3.

The conditions obtaining within a cell such as illustrated in Fig. 3 are diagrammatically indicated in Fig. 4. The desired single or sole direct path or resistance between the electrodes 1 and 21, 22, is comprised of two parts through the paths or resistances R, R. As to the separate or additional path R1 of Fig. 2, however, as described in connection with Fig. 1, with respect to the apertures 10 and 11, there is a difference of potential, that between the electrodes 1 and 2, causing current through the separate or additional path R1. As indicated in Fig. 4, however, the difference of potential between the ends of the path or resistance R1 is substantially zero, and accordingly there is substantially no current through the separate or additional path. This difference of potential is zero because the electrode elements 21 and 22 are at the same potential as effected by the low resistance conductor 23. This is due to the fact that the electrodes 21 and 22 are spaced from each other on opposite sides of the eletrode 1, and are so disposed particularly with respect to the upper and lower apertures that, being at the same potential, no current will flow from 21 to the upper apertures, thence to the lower apertures and back to electrode 22 or 1.

While there has been shown in Fig. 3 the shield or protecting tube 8, it shall be understood that it may be omitted.

Figure 5:
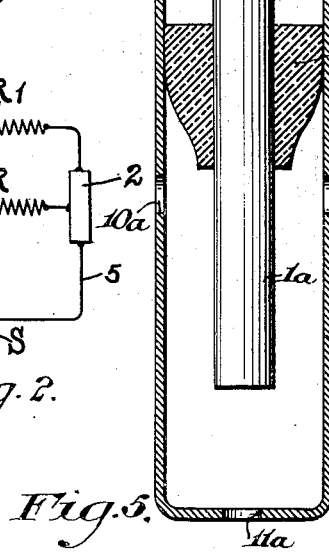
Fig. 5 is a sectional view, in elevation, of a modified form of conductivity cell constructed in accordance with my invention.

In the modified form of my invention shown in Fig. 5 the electrode 2a itself constitutes an equi-potential surface, limiting the flow of current between the electrode 1a positioned therein by a spacing member 7a and the electrode 2a in the fluid path between the electrodes, and within the electrode 2a. The electrodes 1a and 2a may be of any suitable material, the inner electrode being preferably as shown, a solid or hollow cylinder in form and the outer electrode which in a sense operates as a shield therefor, being in form a container, suitably apertured as at 11a and 10a to permit circulation of fluid.

My improved cell may be used in any circuit arrangement or system for measuring, indicating or recording conductivity or any magnitude or condition related thereto; it may also be used in any suitable circuit arrangement or system for effecting control of any character, particularly the control of application to the fluid or electrolytic solution of any suitable material which will affect its conductivity.

What I claim is:

1. A conductivity cell having a single direct inter-electrode path comprising an electrode, a second composite electrode comprising electrode elements spaced from each other and from said first named electrode, a low resistance connection between said electrode elements, a structure within which said electrodes are disposed having an aperture between which and said first named electrode one of said electrode elements is disposed, and an apertured housing of material capable of producing polarization effects.

2. A conductivity cell having a single direct inter-electrode path comprising an electrode, a second composite electrode comprising electrode elements spaced from each other and from said first named electrode, a low resistance connection between said electrode elements, a structure within which said electrodes are disposed having spaced apertures between which and said first named electrode said electrode elements are respectively disposed, and a housing of material capable of producing polarization effects and having spaced apertures co-acting with the spaced apertures of said structure.

3. A conductivity cell having a single direct inter-electrode path comprising an electrode, a second composite electrode comprising electrode elements spaced from each other and from said first named electrode, a low resistance connection between said electrode elements, and a housing of material capable of producing polarization effects and having an aperture between which and said first named electrode one of said electrode elements is disposed.

4. A conductivity cell having a single direct inter-electrode path comprising an electrode, a second composite electrode comprising electrode elements spaced from each other and from said first named electrode, a low resistance connection between said electrode elements, and a housing of material capable of producing polarization effects and having spaced apertures between which and said first named electrode said electrode elements are respectively disposed.

5. A conductivity cell comprising a housing having spaced apertures to permit passage of an electrolyte, in which the cell is immersed, to the interior of said housing, a member disposed within said housing, a pair of electrodes mounted upon said member for contact with electrolyte within said housing between said apertures thereof, a low resistance connection between said electrodes, and an electrode opposite in polarity to said pair of electrodes mounted upon said member between said pair of electrodes.

6. A conductivity cell for immersion in an electrolyte comprising a housing having spaced apertures, a member disposed within said housing, an electrode carried by said member, a pair of electrodes on opposite sides of said first electrode mounted upon said member between said first electrode and said apertures, a low resistance connection between said pair of electrodes, and a second apertured housing of metal containing said first housing.

7. A conductivity cell for immersion in an electrolyte comprising a housing having spaced apertures, a member disposed within said housing, an electrode carried by said member, a pair of electrodes mounted upon said member on opposite sides of said first electrode and between said first electrode and said apertures, and a second housing of metal containing said first housing and having apertures substantially in register with the spaced apertures of said first housing.

LEO BEHR.